(12) United States Patent
Rodgers et al.

(10) Patent No.: US 7,710,395 B2
(45) Date of Patent: May 4, 2010

(54) HEAD-MOUNTED POINTING AND CONTROL DEVICE

(75) Inventors: Allan G. Rodgers, Jericho, VT (US); Robert F. Higgins, Richmond, VT (US); Suzanne T. Gagnon, North Hero, VT (US); James C. Farr, St. Albans, VT (US)

(73) Assignee: Alken, Inc., Colchester, VT (US)

( * ) Notice: Subject to any disclaimer, the term of this patent is extended or adjusted under 35 U.S.C. 154(b) by 1118 days.

(21) Appl. No.: 11/175,877

(22) Filed: Jul. 6, 2005

(65) Prior Publication Data

US 2006/0012571 A1    Jan. 19, 2006

Related U.S. Application Data

(60) Provisional application No. 60/587,709, filed on Jul. 14, 2004.

(51) Int. Cl.
*G09G 5/08* (2006.01)
(52) U.S. Cl. ..................................... 345/157
(58) Field of Classification Search ................. 345/156, 345/157, 158, 163, 6, 8; 340/5.64, 825.19; 702/150; 324/200
See application file for complete search history.

(56) References Cited

U.S. PATENT DOCUMENTS

| | | | |
|---|---|---|---|
| 3,541,541 A | 11/1970 | Engelbart | |
| 4,737,794 A | 4/1988 | Jones | 342/448 |
| 5,287,119 A * | 2/1994 | Drumm | 345/158 |
| 5,305,244 A | 4/1994 | Newman et al. | 364/708.1 |
| 5,694,152 A | 12/1997 | Loop | 345/157 |
| 6,172,657 B1 * | 1/2001 | Kamakura et al. | 345/8 |
| 6,369,564 B1 | 4/2002 | Khalfin et al. | 324/207.17 |
| 6,400,139 B1 | 6/2002 | Khalfin et al. | 324/207.17 |
| 6,624,626 B2 | 9/2003 | Khalfin | 324/207.17 |
| 6,714,841 B1 * | 3/2004 | Wright et al. | 700/259 |
| 6,762,600 B2 | 7/2004 | Khalfin | 324/207.17 |
| 7,405,726 B2 * | 7/2008 | Pelosi | 345/158 |

* cited by examiner

*Primary Examiner*—Abbas I Abdulselam
(74) *Attorney, Agent, or Firm*—Gifford, Krass, Sprinkle, Anderson & Citkowski, P.C.

(57) ABSTRACT

A magnetic tracker system for use on an operator's head makes "mouse"/cursor movements on a screen similar to that of the classic computer "mouse"/track ball/touchpad/joystick. Only head movements are used as opposed to lifting a hand from the keyboard for making such moves. The new "mouse" avoids interrupting the hands from their position on the keyboard and has no moving mechanical parts that become clogged and that need a special surface (mouse pad) or special surface measurements (optical mouse).

14 Claims, 3 Drawing Sheets

HEAD-MOUNTED POINTING AND CONTROL DEVICE

REFERENCE TO RELATED APPLICATION

This application claims priority from U.S. Provisional Patent Application Ser. No. 60/587,709, filed Jul. 14, 2004, the entire content of which is incorporated herein by reference.

FIELD OF THE INVENTION

This invention is related to computer pointing devices and, in particular, to hands-free alternatives to the conventional "mouse."

BACKGROUND OF THE INVENTION

The so-called computer "mouse," and other pointing devices such as the trackball, touchpad and joystick, have allowed the computer industry to use the display monitor as a continuously variable control and data input device. This has made difficult computer concepts available and controllable by individuals not at all versed in the computer art.

There are situations, however, where the mouse is inconvenient and limiting to computer operation because of the necessity for the user to remove his/her hands from the keyboard, or to empty at least one hand from carrying an item in order to maneuver and actuate the "mouse." Furthermore, it is usual to need to supply extra desktop space for this instrument and in many instances a special surface for it to operate properly.

Many innovations have been made to reduce the occurrence of contaminants entering the rolling mechanical element in a mouse or track ball such as use of optical and touch-sensitive devices. This does not remove the requirement, however, for changing hand position or emptying at least one hand to locate the "mouse" and maneuver it.

One type of application in particular where this occurs often is in the construction and use of spreadsheets such as the popular Microsoft application EXCEL, where navigation to spreadsheet cells and control panel functions are greatly enhanced with the "mouse" but at the same time cause the user to remove his/her hands from the keyboard, which is necessary for making alphanumeric entries into the cells. Other examples of this inconvenience also can be brought to mind.

Although there are myriad prior-art teachings on the computer mouse, track ball, touch panel, joystick and even 3D mouse, no existing system uses totally electronic motion trackers to achieve hands-off mouse functioning. The closest approach appears to be an optical IR unit designed to fit atop a computer monitor to track a reflective spot stuck to the user's forehead (see DynaSight™, a device trademarked by Origin Instrument Corp., www.orin.com, no patent cited). The DynaSight has obvious limitations in set-up, size, weight, mobility, ruggedness and power consumption compared to the current invention.

The original Engelbart mechanical mouse patent (U.S. Pat. No. 3,541,541) through optical-mechanical and optical and a recent packaging to relieve carpal tunnel syndrome called "The Quill" all require a hand to operate. One unit, called the "Nohands Mouse (U.S. Pat. No. 5,694,152)," consists of units placed on the floor under the operator's feet where light foot pressure from an elevated chair position manipulates the mouse and apparently also is of a mechanical nature. This approach could be a good solution for healthy, well-coordinated individuals, particularly if carpel tunnel were their problem, but the invention would be of little assistance to the physically challenged. Nor would this system or DynaSight be appropriate if the operator must stand or walk while operating a computer, especially a mobile unit such as a laptop computer or a computer made for wearing on the body such as in U.S. Pat. No. 5,305,244.

Such actions interrupt the speedy flow of keyboard operations, and leads to typing errors and delays. All too often the edge of the mouse pad is reached or another obstacle on the desk is encountered causing additional time to be spent. Furthermore, the moving mechanical parts of the typical mouse picks up dust and other contaminants that must be cleaned out periodically in order to restore proper operation. There also is contention that the mouse contributes to a painful wrist condition known as carpel tunnel syndrome for which various shapes of the mouse have been designed to alleviate.

Hands-free position and orientation tracking systems do exist. U.S. Pat. No. 4,737,794, the teachings of which are incorporated herein by reference, disclose a method and apparatus for determining remote object orientation and position with an electromagnetic coupling. A plurality of radiating antennas are provided for radiating electromagnetic energy. Each of the radiating antennas have independent components for defining a source reference coordinate frame. A transmitter is provided for applying electrical signals to the radiating antennas for generating a plurality of electromagnetic fields. The signals are multiplexed so that the fields are distinguishable from one another. A plurality of receiving antennas are disposed on a remote object for receiving the transmitted electromagnetic fields. The receiving antennas have a plurality of independent components for detecting the transmitted electromagnetic fields and defining a sensor reference coordinate frame. An analyzer is provided for receiving the output of the receiving antennas and converting the components of the transmitted electromagnetic fields into remote object position and orientation relative to the source reference coordinate frame.

The analyzing means includes means for processing the components of the electromagnetic fields independently into remote object position in Cartesian coordinates and remote object orientation using a quaternion processing strategy. The processing technique provides an uncoupled, non-iterative, closed form solution for both position and orientation which is fast and continuous. Further, in the case where dipole antennas are used and the size of the antennas is significant relative to the separation distance between the radiating and receiving antennas, an aperture compensation technique is provided for compensating for distortion in the dipole fields. Still further, the processing technique provides an arrangement for smoothing or filtering the solution for position and orientation by blending previous solutions into the current solution.

FIG. 1 is a diagram that illustrates three-dimensional (3D) head/helmet tracking using AC magnetics, wherein a transmitter couples signals to at least one sensor. Use of a dipole field model allows position and orientation (P&O) of the receiver/sensor to be determined with a single data sample. In actuality, the P&O is a relative computation between source and sensor, such that reciprocity holds true and it makes no difference which device is being tracked from the other as a reference. U.S. Pat. Nos. 6,369,564; 6,400,139; 6,624,626; and 6,762,600, each of which are also incorporated herein by reference, teach various techniques to overcome distortion in AC magnetic tracking systems.

SUMMARY OF THE INVENTION

This invention resides in a new "mouse" that eliminates the shortcomings of the prior art by allowing operations to be obtained through simple head motions without the need for the operator's hands to operate two desktop instruments which interrupt work flow. Furthermore, the head motion can be detected without moving mechanical components, thereby avoiding the collection of clogging debris. The likelihood of fewer typing errors also is significant because the hands stay at the keyboard operating a single desktop instrument.

In the preferred embodiment, both the transmitter and receiver are placed on the user's body such that they are both moving about, but it is the tracking of relative movement that is important here. In particular, a hands-free "mouse" is achieved by placing the transmitter-receiver pair at the base of the neck and the base of the skull. A "necklace" holds one component over the back of the shoulders, and a headband positions the other component at the base of the skull is one way to conveniently accomplish placement. For magnetic trackers, this is an ideal placement with only 2" to 6" spacing between them so that only very small signals are required and interference from outside signal sources or conductive or magnetic materials is highly unlikely.

DETAILED DESCRIPTION OF THE INVENTION

This invention broadly applies technologies used for tracking head movement in virtual reality games and military helmet mounted displays to provide a wireless, hands-free cursor control or "mouse." As such, mouse and cursor movements are made by monitoring user head movements and actuation/selection by a key on the keyboard where the hands are already employed, thereby eliminating the disruption of locating and manipulating a conventional mouse device. Alternatively, the tracking of particular head nods, twists and/or shakes may be processed via software to emulate mouse button actuations, leading to a control device for use by a person whose hands are otherwise involved in holding or employing a tool or instrument. Such a capability is particularly important to users lacking in hand mobility or dexterity, or indeed even missing a hand.

As opposed to a complex head/helmet tracking device, which is extremely costly and provides much more capability than is actually required, the invention resides in a greatly simplified tracking device more conducive to the economies of scale in mass production, while being simple, reliable, easy to install and use. This simplification can be accomplished by reducing the standard number of coupling coils in a magnetic tracker and corresponding reduction in the electronics channels that support them. Great accuracy is not required for the "mouse" function because the user is in the control loop and can adjust easily to what is being observed just as occurs in the conventional "mouse" devices. Stable, noise-free operation with minimal alteration of normal operator involvement and adaptability to the vast majority of the user population are primary requirements.

In addition to mouse replacement, a more advanced application includes a low cost alternative for at least a partial virtual reality (VR) display application. Because head angles will be measured by the system, VR capabilities such as in electronic games and visual exploration of scientific objects such as created by CAD (computer-aided design) systems also becomes possible.

Figure 1:
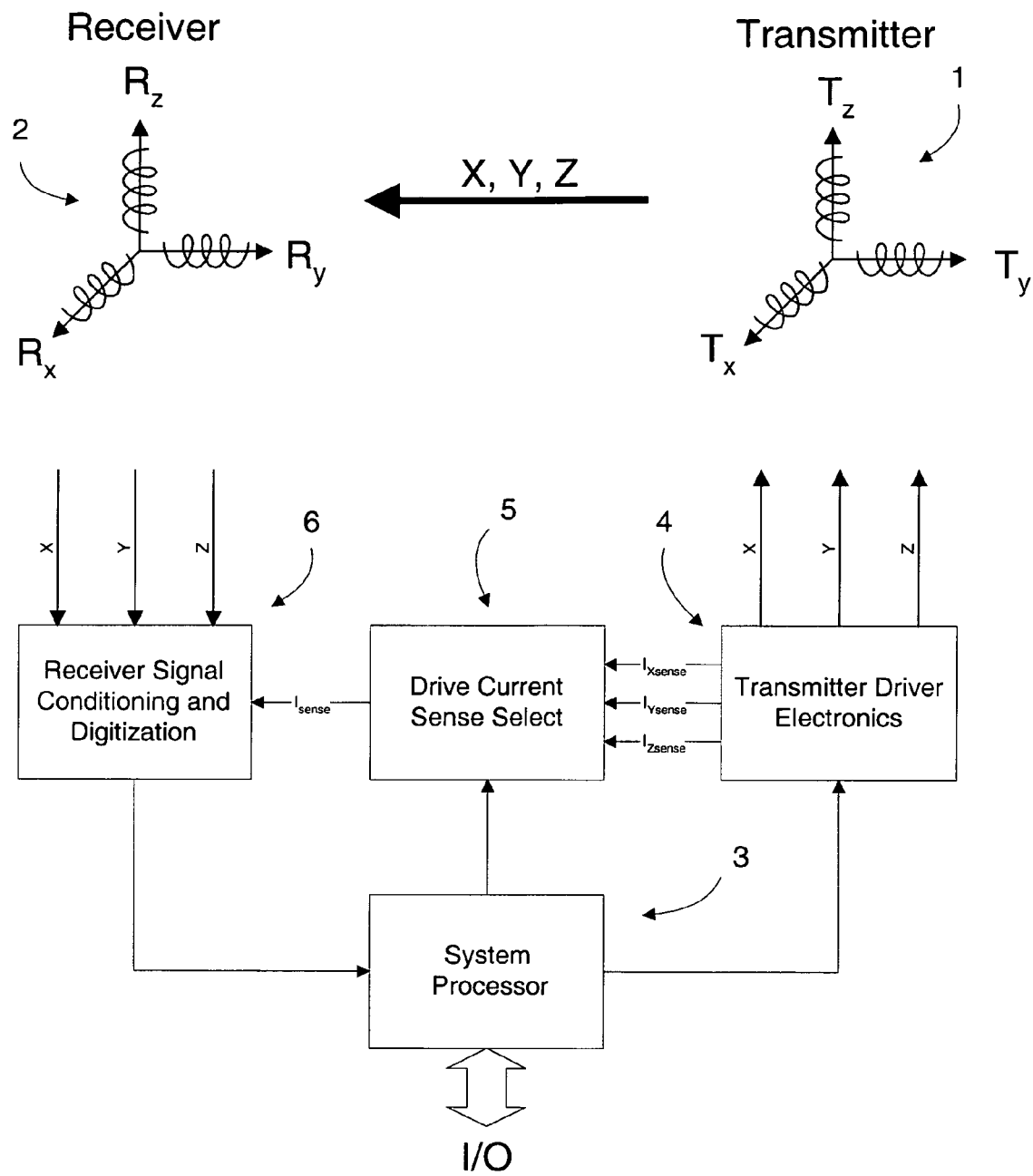
FIG. 1 is a diagram that illustrates 3D head/helmet tracking using AC magnetics.
Figure 2:
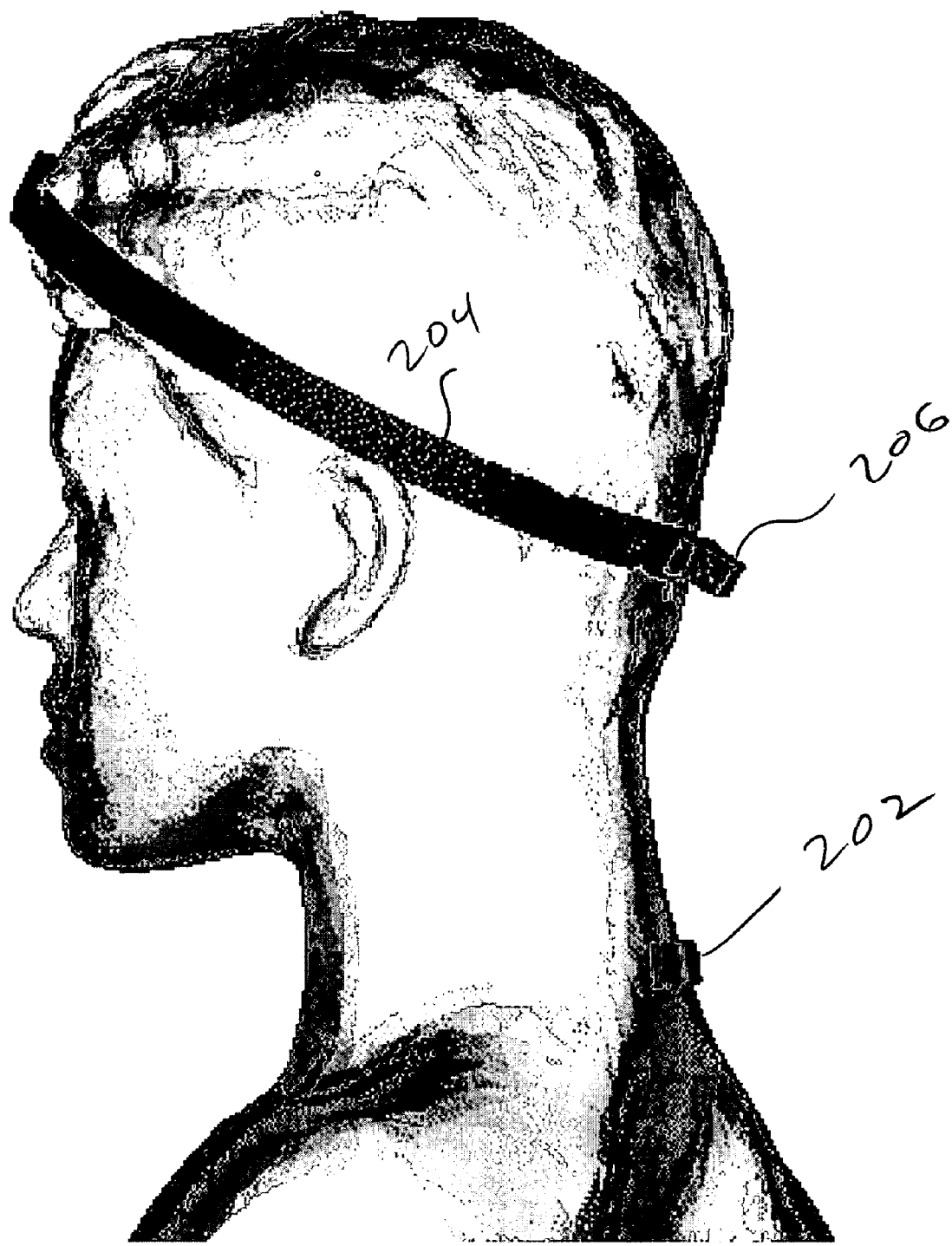
FIG. 2 shows how a hands-free pointing device can be achieved by placing the transmitter-receiver pair at the base of the neck and the base of the skull.

According to this invention, all functions necessary for a hands-free "mouse" are achieved by placing the transmitter-receiver pair at the base of the neck and the base of the skull as shown in FIG. 2. A "necklace" holding one component 202 over the back of the shoulders and headband 204 with the other component 206 at the base of the skull is one way to conveniently accomplish placement. For magnetic trackers, this is an ideal placement with only 2" to 6" spacing between them so that only very small signals are required and interference from outside signal sources or conductive or magnetic materials is highly unlikely.

The typical magnetic tracker has three orthogonal coils in both the transmitter and receiver devices in order to obtain the complete P&O in 3D space. Since only two dimensions are needed to cover a computer monitor the sets of coils can be either kept at three or reduced for simplicity and cost savings as well as greater reliability in the system with fewer channels to operate.

The simplified tracker (see FIG. 3) can be made to resemble a "mouse" input as it is connected to a computer. A small processing unit for the head mouse tracker can be fit either onto the body or be placed on the desk top and could eventually be integrated within the computer chassis. Software algorithmically determines "left button" and "right button" head motions. These "button" algorithms are preferably left for the user to customize for his/her own best choices. A slight complication of adding back a third coil on either the transmitter or the receiver to yield two more data inputs that may prove necessary to achieve special features or make the processing the most reliable, but this is not a requirement according to the invention.

Figure 3:
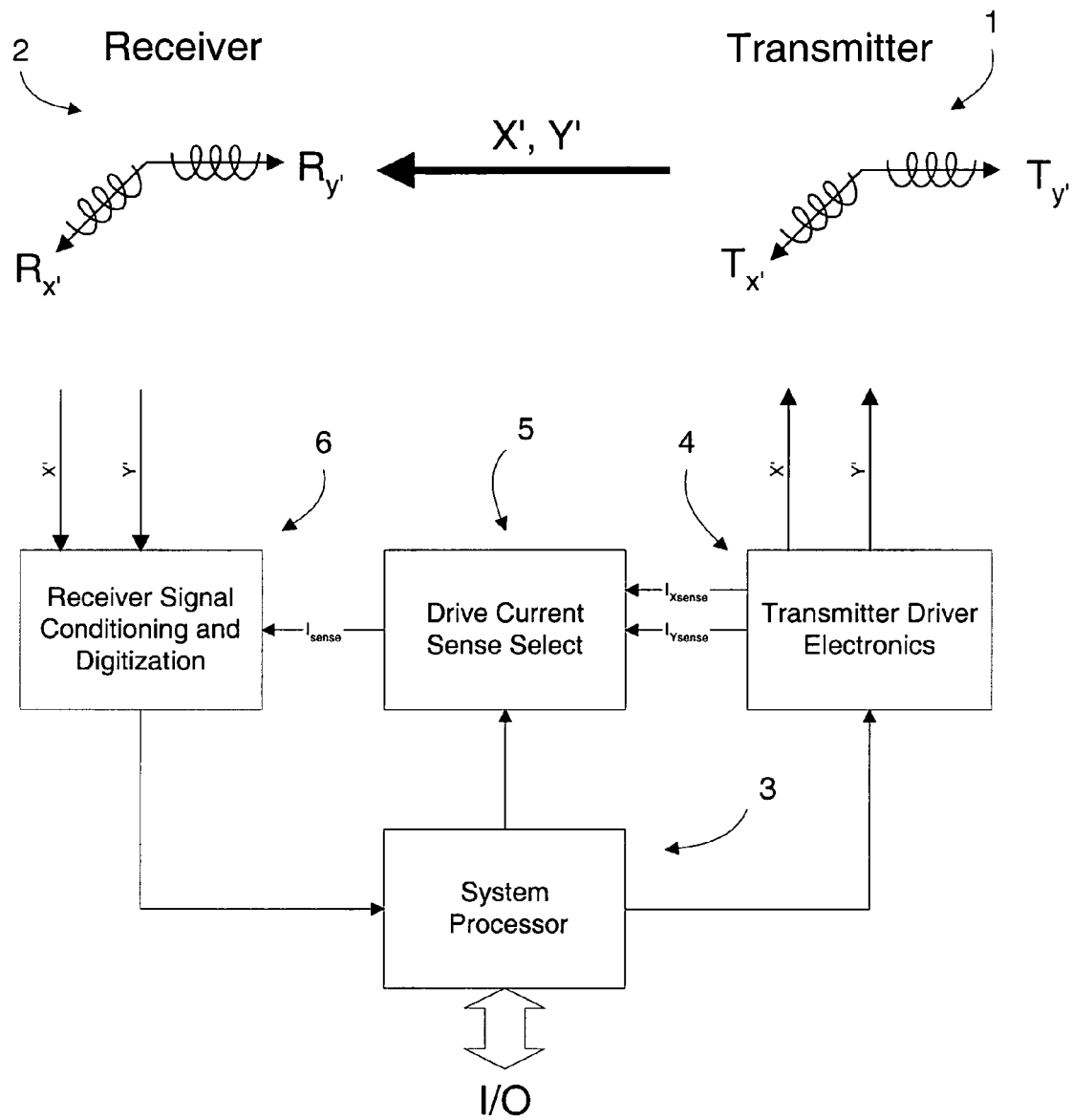
FIG. 3 depicts a simplified tracker made to resemble a "mouse" input as it is connected to a computer.

A simplified tracker having four coils, such as shown in FIG. 3, should provide four relationships (2×2 matrix between item 1 transmitter and item 2 receiver), such that x-y mouse position and an elevation angle for scrolling are only three variables required. It is worth pointing out here that the two remaining coils in each device may no longer be orthogonal to each other. Also, the adding back of just one of the original coils to either device could add two more dimensions.

Other embodiments could use a magnetic pulsed DC version of the simplified tracker, an inertial or MEMS version, an optical tracker version or in some instances an ultrasonic version. All of these approaches are anticipated as alternative configurations.

We claim:

1. A method of controlling a computer, comprising the steps of:

display a pointing device on a display screen;

positioning an AC magnetic transmitter-receiver pair on a user, with one of the receiver and transmitter being supported on the head of a user; and tracking the relative position and/or orientation of the transmitter-receiver pair through head movements of a user; and controlling the pointing device as a function of the tracked relative position and/or orientation.

2. The method of claim 1, including the step of positioning the transmitter-receiver pair at the base of a user's neck and at the base of a user's skull.

3. The method of claim 1, including the step of positioning the transmitter or receiver at the base of a user's neck.

4. The method of claim 1, including the step of positioning the transmitter or receiver at the base of a user's skull.

5. The method of claim 1, wherein the transmitter-receiver pair each include two coils.

6. The method of claim 1, wherein the transmitter-receiver pair each include two orthogonal coils.

7. The method of claim 1, further including the step of recognizing particular head nods, twists and/or shakes to emulate mouse button actuations.

8. Apparatus for controlling the position of a cursor or other pointing device on the display of a computer, comprising:
   a first magnetic coil supported on a head of a user;
   a second magnetic coil supported on a portion of the user's body other than the user's head;
   one of the first and second coils functioning as a magnetic field transmitter and the other functioning as a magnetic field receiver;
   a processor operative to determine the position or orientation of the magnetic field receiver relative to the field transmitter;
   an electronic interface in communication with a computer having a display device; and
   electronics operative to control the position of a cursor or other pointing device on the display through the electronic interface as a function of the position or orientation of the magnetic field receiver relative to the field transmitter as determined by the processor through user head movements.

9. The apparatus of claim 8, wherein one of the magnetic coils is positioned at the base of a user's neck and the other of the magnetic coils is positioned at the base of a user's skull.

10. The apparatus of claim 8, further including a necklace for positioning one of the magnetic coils at the base of a user's neck.

11. The apparatus of claim 8, further including a headband for positioning one of the magnetic coils at the base of a user's skull.

12. The apparatus of claim 8, wherein the transmitter or receiver includes two or three magnetic coils.

13. The apparatus of claim 8, wherein the transmitter or receiver includes two or three orthogonal coils.

14. The apparatus of claim 8, wherein particular head nods, twists and/or shakes may be processed to emulate mouse button actuations.

* * * * *